May 5, 1942. B. M. SHAUB 2,282,253
PHOTOMETER
Filed April 8, 1940 2 Sheets-Sheet 1

Witnesses
Mary S. Shaub
Elliott B. Church

Inventor
Benj. M. Shaub

May 5, 1942.                B. M. SHAUB                2,282,253
PHOTOMETER
Filed April 8, 1940                2 Sheets-Sheet 2
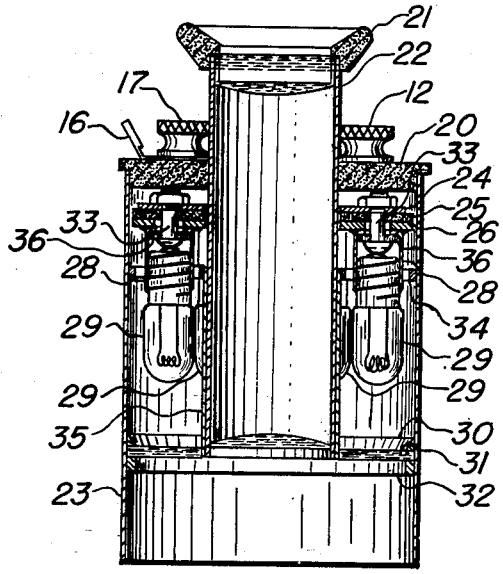
Fig.5.
Section M-M', Fig.3.
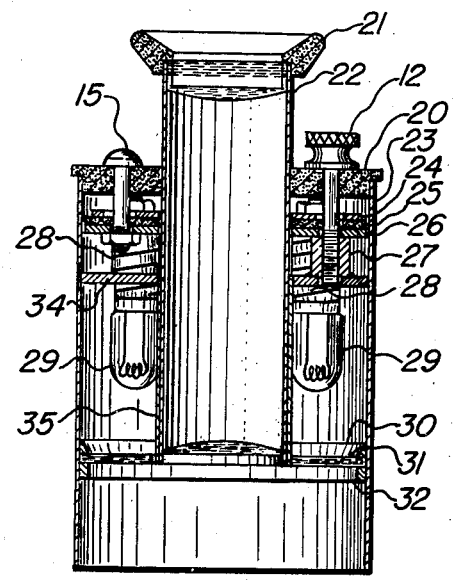
Fig.6.
Section N-N', Fig.3.
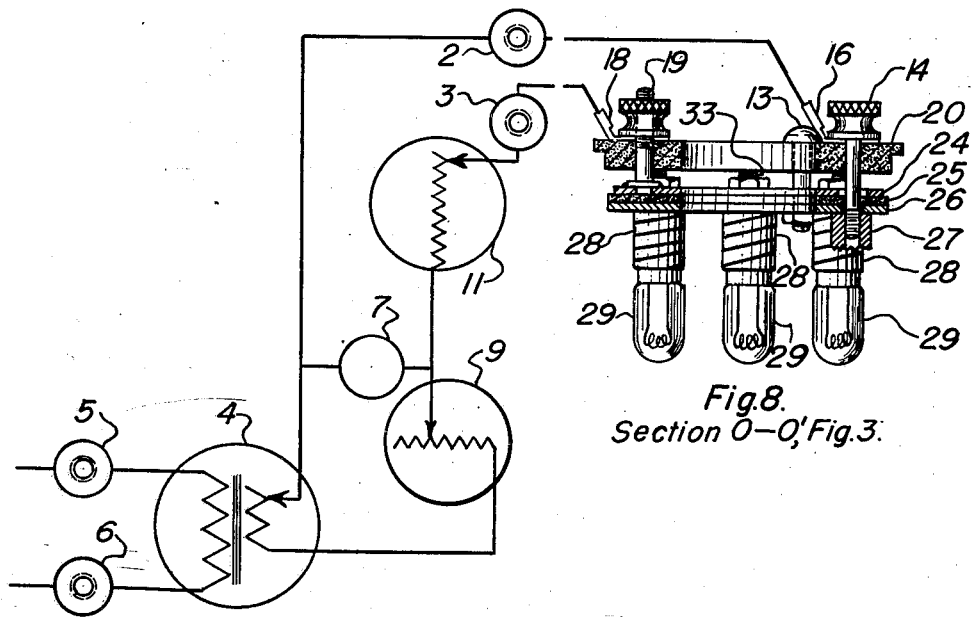
Fig.7.
Fig.8.
Section O-O', Fig.3.
Witnesses
Mary S. Shaub
Elliott B. Church
Inventor
Benj. M. Shaub Patented May 5, 1942

2,282,253

UNITED STATES PATENT OFFICE 2,282,253

PHOTOMETER

Benjamin Martin Shaub, Northampton, Mass.

Application April 8, 1940, Serial No. 328,453

3 Claims. (Cl. 88—23)

This invention relates to certain improvements in photometers as used for determining photographic exposures, and the nature and objects of the invention will be readily recognized and understood by those skilled in the arts involved in the light of the following explanation and detailed description of the accompanying drawings illustrating what I at present consider to be the preferred embodiments or mechanical and electrical expressions of my invention from among various forms, arrangements, combinations and constructions of which the invention is capable within the spirit and scope thereof.

The invention is directed particularly to and deals with a type of photometer which consists of a combination of two units electrically connected. One unit consists of standard electrical control devices while the other unit consists of a portable "scanner" which together with the electrical control devices provide a novel and useful invention for determining quantitatively photographic exposures when the device is used with cameras having a ground glass focusing screen or panel. The "scanner," in its preferred form, consists of a tubular body supporting a low-power microscope, a series of panel lamps and a circular diffusing screen, as a disk of ground glass, having a central circular opening.

The present invention has as one of the main objects the determination of the length of the exposure time necessary to correctly expose any given photographic film, plate or other light-sensitive devices by comparing the intensity of the light of an image produced on a ground glass viewing and focusing screen, or on other translucent screens, by a lens or other device, with a counter and equally intense illumination or light produced by properly adjusting the alternating voltage applied to the panel lamps of the "scanner" when placed on a ground glass screen on which the photographic image has been focused.

A further object of the invention is to provide a design, construction and arrangement of a photometer which is of simple form capable of efficient and accurate use for the purpose mentioned as well as other purposes and uses which may exist and which is capable of ready manufacture without special machinery and at a relatively low cost.

With the foregoing general objects and certain other objects and results in view which will be readily apparent from the following explanation, the invention consists of certain novel features in construction and in combinations and arrangements of elements forming the invention as will be more fully and particularly referred to and specified hereinafter.

In order that my invention may be fully understood, I have illustrated in the annexed drawings, by way of example, several views and sections of my invention.

Referring to the accompanying drawings:

Fig. 5 is a detailed view, in direction of the arrows, of a section along line M—M' of Fig. 3.

Fig. 6 is a detailed view, in direction of the arrows, of a section along line N—N' of Fig. 3.

Fig. 7 is a schematic diagram of the electrical devices for controlling applied voltage and housed in box shown in Figs. 1 and 2.

Fig. 8 is a detailed view, in direction of the arrows, of a cross section along line O—O' of Fig. 3 showing section of demountable panel lamp assembly only.

Figure 1:
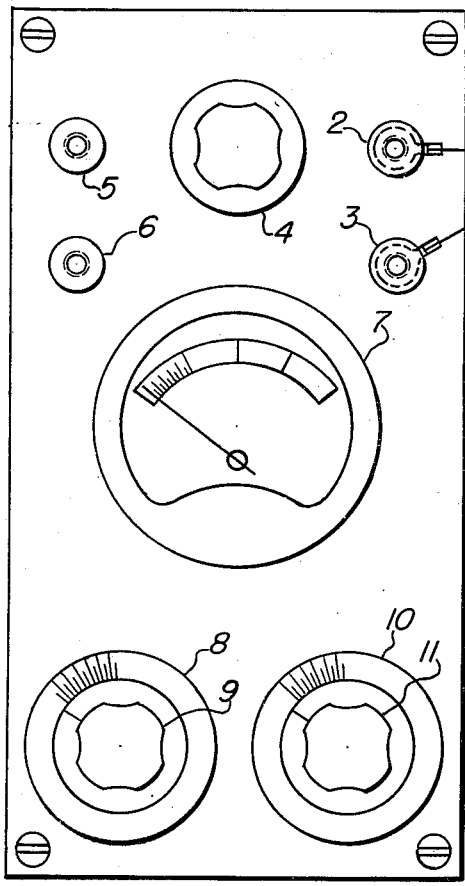
Fig. 1 is a top plan view of a box containing electrical control devices for regulating the applied alternating voltage, supporting the hand knobs for operating the devices, and also graduated scales for indicating the various phases of the devices.
Figure 2:
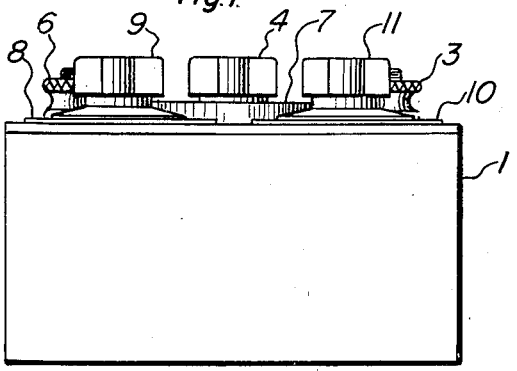
Fig. 2 is a view in end elevation of a box, containing the devices for regulating the applied voltage, and which is shown in top plan view in Fig. 1.

In Figs. 1 and 2 of the drawings a box for the alternating voltage control devices is shown. The electrical devices consist of a variable step-down voltage transformer 4, or such other standard electrical device which may be readily procured on the market and used to step down the line voltage to 12 volts, more or less, that are required for lamps 29, Fig. 5. The value of the stepped down voltage is indicated by means of a suitable voltmeter 7 for the voltage range necessary. A finer adjustment of the voltage may be obtained by means of a low resistance potentiometer 9 which may be provided with a scale 8 to indicate the amount of resistance added to the circuit. A potentiometer 11, Fig. 7, having a suitable resistance of 22 ohms, more or less, is placed in series with lamps 29, Fig. 8, so that by cutting out the resistance an increased voltage is applied across terminals 2 and 3 to which the "scanner," Fig. 3, is connected by a suitable two-wire extension cord.

Figure 3:
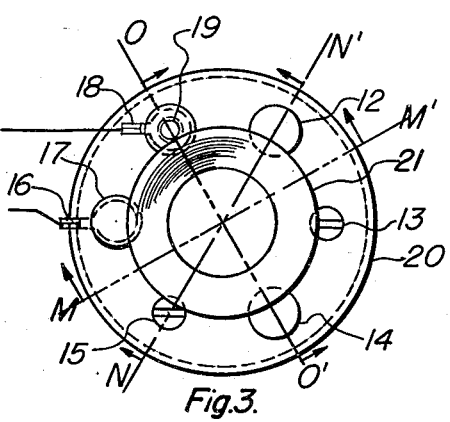
Fig. 3 is a top plan view of the "scanner."
Figure 4:
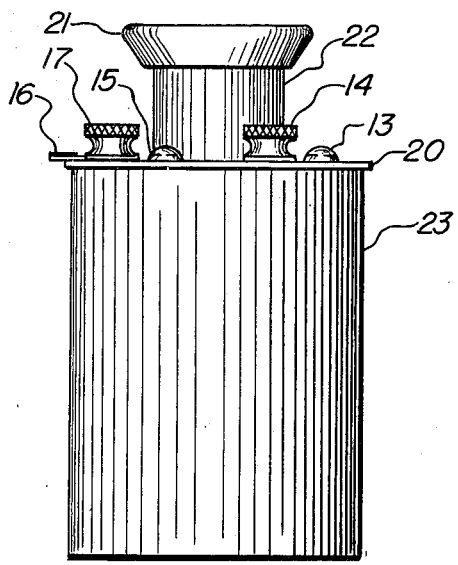
Fig. 4 is an elevation of the "scanner."

The "scanner," Figs. 3 and 4, consists of a short tubular body 23, which is preferably of cylindrical cross section, but may be of other cross sections, and which supports an assembly of lamps shown in a detailed section in Fig. 8; also a low-power microscope 22 for viewing a photographic image on a screen, as for example on a ground glass viewing and focusing screen, of a camera. The "scanner" body also functions to exclude extraneous light from falling on the part of the ground glass focusing screen under examination.

More detailed views of the "scanner" are shown in Figs. 5 and 6. Fig. 5 is a section taken along the line M—M', in the direction indicated by the arrows, of Fig. 3, while Fig. 6 is taken along line N—N', in the direction of the arrows, of Fig. 3.

The basic construction consists of a body 23, Figs. 5 and 6, supporting a translucent diffusing screen 31, a low-power microscope 22, and a series of small panel lamps 29 in such a manner as to direct a diffused illumination of varying intensity from the lamps onto a plane upon which the "scanner" may be placed and exclude from said plane within the section of the body 23 all light from other extraneous sources. The interior of body 23 is coated with a paint or other material having a high reflectivity.

This construction may be obtained by attaching to body 23, which may be of any regular cross section, but preferably cylindrical, and of any of various suitable materials as metals or opaque "plastics," a supporting member 34 to which is attached by soldering, threading or by other available methods at a central circular opening a tube 35 which is of such dimensions as to allow microscope 22 to be moved within tube 35. The fit between microscope 22 and tube 35 has sufficient frictional resistance to permit ready and easy focusing of the microscope, but firm enough to hold the microscope in any position by slitting tube 35 in such a manner that a part of the tubular surface may bear as a spring against microscope 22. The microscope may be readily removed from the "scanner" by withdrawing it completely.

The diffusing disk 31 may consist of a circle of "flash opal" glass or ordinary sheet glass having one or both sides finely ground or any similar translucent material through which a central hole having a diameter equal to the outside diameter of tube 35 may be made and into which tube 35 extends. The supporting member 34 is provided with openings through which a portion of each panel lamp may extend.

A support and the electrical connections for the lamps are shown in section in Fig. 8 which is a section along the line O—O' of Fig. 3 and in the direction indicated by the arrows in that figure. A series of lamp sockets 28 are attached to plate 26, Figs. 5, 6 and 8, which is an electric conductor. A convenient, but not the only, manner of attaching the sockets is by the use of solder. The lamps 29 are screwed into the threaded metal sockets 28 attached to plate 26 and thereby make an electrical contact with one side of the filament through socket 28 to plate 26 which rests upon a metallic support 27. Screws 12, 14 and 17 engage part 27 which is threaded to function as a nut. Electrical terminal 16 of the extension cord may be attached to any one of the screws 12, 14 or 17 and thus complete the electric circuit from one side of the filament. The other side of the filament connects to a boss on the base of lamp 29, Fig. 5, and makes contact with the head of screw 33 insulated from socket 28 by a non-conducting washer of fiber or other suitable insulating material. The screw 33 is insulated from part 26 by passing with ample clearance through a large hole in part 26. The screw 33 makes electrical contact with part 24, a metal conductor, by having the nut of screw 33 in metallic contact. Parts 24 and 26 are separated and insulated by part 25, which may be made of hard rubber, mica, "Bakelite" or some other suitable insulating material. The electrical circuit is thus completed through screw 19, Fig. 8, which is soldered or otherwise metallically joined to part 24. From 19 a connection is made through terminal 18 of the extension cord. Parts 24, 25 and 26 are held in place by screws 33.

The top of the lamp assembly, part 20, Figs. 5, 6 and 8, consists of an electrical insulating material as hard rubber or "Bakelite" or other "plastic" which is a non-conductor of electricity. Part 20 rests upon the ends of screws 33 and is held in position by screws 13, 15 and 19. A central hole, with proper clearance, is cut in parts 20, 24, 25 and 26 to allow the insertion of microscope 22 into tube 35. The lamp assembly, Fig. 8, makes a unit which can be removed from body 23, after withdrawing microscope 22 and removing screws 12, 14 and 17, in order to replace burnt-out lamps or to inspect the lamps for metallic deposition from the hot filaments which would decrease the intensity of illumination for a given voltage across the lamp terminals.

In Fig. 7 is shown diagrammatically a manner of connecting the electrical devices for controlling the voltages applied to the lamps of the "scanner."

The operation is as follows:

An image, of the object to be photographed, is obtained on a ground glass by the usual method of properly focusing the camera on the object and setting the lens stop at the desired opening to produce the best or desired results. In this condition the required exposure may be determined by placing the "scanner" on the ground glass focusing panel and removing resistance from the lamp circuit by turning the knob of potentiometer 11 until the lamps emit light having a brightness level equal to the brightness level of the photographic image projected on the ground glass, thereby causing the projected image on the ground glass, except for the brightest parts, to fade from view when observed through the low-power microscope. The reading obtained on scale 10, Fig. 1, at the point where the image fades completely from view is a measure of the required exposure time for a correctly exposed negative of the particular film in use.

The correct exposure may then be determined as follows:

Accompanying the photometer there will be an "exposure curve" from which one may obtain an exposure in seconds or minutes for the various settings or markings on scale 10. The "exposure curve" will be constructed for some photographic emulsion of known sensitivity according to one of the widely used speed ratings. Other photographic films or plates would receive an exposure depending on their sensitivity as compared with the sensitivity of the emulsion used for determining the "exposure curve." As an example, one may find that the illumination from lamps 29 balances the light intensity of the desired part of the photographic image on the ground glass when the reading on scale 10, Fig. 1, is "70." Referring to the "exposure curve" one finds that the correct exposure for reading "70" should be ½ second for an emulsion having the sensitivity rating of the photographic emulsion used for the "exposure curve," which is, say, "Weston 24," while the film or plate in use has a sensitivity of "Weston 8." Hence the correct exposure for the plate in use should be 24/8×½=1½ seconds.

The photometer may also be operated with direct current from any direct current source as storage batteries or current generated by a direct current dynamo by making proper changes in the electrical devices specified in Fig. 7. The necessary change would consist of eliminating the step-down variable transformer 4, and substituting a suitable variable resistor. A slight change in the "exposure curve" would be necessary when using direct current. The panel lamps may be connected in either parallel or series for either alternating or direct current. The voltmeter would have to be of the proper resistance and current-carrying capacity.

Other types of lamps may be used in place of the panel lamps; for instance, one may use a circular lamp containing a filament along its central part or two or more arcuate lamps having centrally located filaments. The latter lamps may, like the panel lamps, be connected either in parallel or in series. Lamps of still other variations may be used without altering the scope and purpose of the invention.

It will be evident that these and other changes, modifications and variations may be made in the invention which is not limited to the particular construction and arrangement of parts hereinbefore described, but which may be varied as desired to suit particular requirements without exceeding the scope of the invention. It is also evident that various substitutions might be resorted to without departing from the spirit and scope of my invention, and hence I do not wish to limit myself to the exact and specific disclosures hereof.

Desiring to protect my invention in the broadest manner legally possible, what I claim is:

1. A photographic exposure meter of the character described comprising an opaque tube, open at one end and closed at the opposite, supporting coaxially a low-power microscope which extends, in part, through an opening in the opaque tube cover, a source of illumination surrounding the microscope within the opaque tube, a means of excluding the light emitted by said light source from entering the microscope directly and a diffusing screen between the light source and the open end of said opaque tube for distributing light from said source onto a focusing panel of a camera when the open end of said opaque tube is held adjacent to said focusing panel, the diffusing screen having a centrally located opening for observing the illuminated surface of the focusing panel through the microscope, the said light source being electrically connected to a calibrated potentiometer for changing the intensity of the light emitted by varying the applied voltage from an initially predetermined value, the initial predetermined voltage being obtained from any sufficient source by means of a suitable standard voltage regulating device.

2. A photographic exposure meter of the character described comprising an opaque tube, open at one end and closed at the opposite, supporting coaxially a low-power microscope which extends, in part, through an opening in the opaque tube cover, a source of illumination surrounding the microscope within the opaque tube, a means of excluding the light emitted by said light source from entering the microscope directly and a diffusing screen between the light source and the open end of said opaque tube for distributing light from said source onto a focusing panel of a camera when the open end of said opaque tube is held adjacent to said focusing panel, the diffusing screen having a centrally located opening for observing the illuminated surface of the focusing panel through the microscope, the said microscope being held by friction in a slitted tube for the purpose of focusing the microscope on said illuminated focusing panel of a camera.

3. A photographic exposure meter of the character described comprising an opaque tube, open at one end and closed at the opposite, supporting coaxially a low-power microscope which extends, in part, through an opening in the opaque tube cover, a source of illumination surrounding the microscope within the opaque tube, a means of excluding the light emitted by said light source from entering the microscope directly and a diffusing screen between the light source and the open end of said opaque tube for distributing light from said source onto a focusing panel of a camera when the open end of said opaque tube is held adjacent to said focusing panel, the diffusing screen having a centrally located opening for observing the illuminated surface of the focusing panel through the microscope, the assembly of said light source and cover of said opaque tube being removable as a unit from the opaque supporting tube for the purpose of inspection and renewing lamps.

BENJAMIN M. SHAUB.